United States Patent Office 3,642,771
Patented Feb. 15, 1972

3,642,771
5-BENZYL - (2'-DESOXYRIBOSYL) URACIL COMPOUNDS, COMPOSITIONS CONTAINING SAME, AND PROCESS OF MAKING AND USING SAME
Kailash Kumar Gauri, Lentfohrden, Holstein, Germany, assignor to Robugen G.m.b.H., Esslingen, Germany
No Drawing. Continuation-in-part of application Ser. No. 744,957, July 15, 1968. This application July 11, 1969, Ser. No. 841,143
Claims priority, application Austria, July 11, 1968, A 6,706/68
Int. Cl. C07d 51/52
U.S. Cl. 260—211.5 R                          3 Claims

ABSTRACT OF THE DISCLOSURE

5 - benzyl substituted 3-(2'-deoxyribosyl) uracil compounds have a surprisingly high virostatic activity. The compounds are used in the treatment of virus diseases and have proved of considerable value in the treatment of herpes infections by topical administration, for instance, in the form of solutions, ointments, powders, sprays, plasters, and others.

RELATED APPLICATION

The present application is a continuation-in-part of copending application Ser. No. 744,957, filed July 15, 1968 and entitled "Substituted (2'-Deoxyribosyl) Uracil Compounds, Compositions Containing Same and Process of Making and Using Same." now Pat. No. 3,553,192.

BACKGROUND OF THE INVENTION (1) Field of the invention

The present invention relates to new uracil compounds and more particularly to 5-benzyl-(2'-deoxyribosyl) uracil compounds, to pharmaceutical compositions containing such 5-benzyl-(2'-deoxyribosyl) uracil compounds, to a process of making them, and to the use of such compounds and compositions in therapy.

(2) Description of the prior art 5-alkyl uracil compounds are known. They are homologues of thymine, i.e. 5-methyl uracil. These known 5-alkyl uracil compounds do not exhibit any virostatic activity as has been shown by M. Muraoka, A. Takada, and T. Ueda in "Keio J. Med." vol. 11 page 95 (1962); abstrated in "Chem. Abstr." vol. 57, page 17192b (1962).

Investigations have shown that 1,5-disubstituted uracil compounds have also no virostatic activity.

SUMMARY OF THE INVENTION

The present invention now has for its object to provide new and valuable 5-substituted uracil compounds which have a surprisingly high virostatic activity.

Another object of the present invention is to provide a simple and effective process of producing such 5-substituted uracil compounds of high virostatic activity.

Other objects of the present invention and advantageous features thereof will become apparent as the description proceeds.

In principle, the present invention is concerned with valuable 5-substituted uracil compounds which carry in 3-position a deoxyribosyl group. Such compounds correspond to the following formula

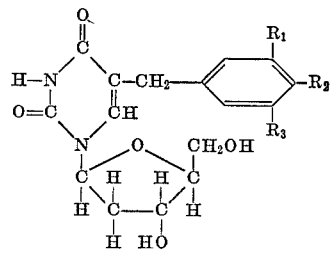

In said formula
$R_1$, $R_2$, and $R_3$ are hydrogen, halogen, lower alkyl, lower alkoxy, trifluoro methyl, nitro, amino, or mono- or di-lower alkyl substituted amino Alkyl or alkoxy in said formula may be straight chain or branched alkyl or alkoxy, preferably with 1 to 4 carbon atoms. The alkyl in the mono- or di-lower alkyl substituted amino group has preferably 1 or 2 carbon atoms.

The 3-deoxyribosyl uracil compounds according to the present invention which may also be designated as deoxyribofuranoyl uracil compounds or as deoxyuridine compounds, are preferably prepared by reacting 5-benzyl substituted uracil compounds or their reactive derivatives, for instance, their trimethyl silyl compounds with reactive deoxyribose compounds, preferably with reactive deoxyribose compounds in which the hydroxyl groups are protected. Such reactants are, for instance, halogeno deoxyribose compounds, the hydroxyl groups of which are protected by conversion into acyloxy groups, such as acetoxy, benzoyloxy, p-toluoyloxy, anisoyloxy, p-nitro benzoyloxy, and other acyloxy groups and preferably into p-chloro benzoyloxy groups.

The mercury salts of the 5-monosubstituted uracil compounds may also be used as the one reactant. The mercury salts correspond to the following formula:

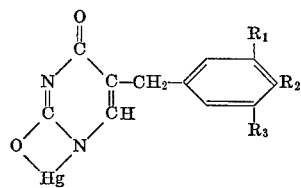

The resulting reaction product is a mixture of the α-anomer and the β-anomer.

The protected hydroxyl groups of the deoxyribosyl group are finally reconverted into the free hydroxyl groups, for instance, by selective cleavage by means of an alkali metal alcoholate, preferably sodium methanolate, or by means of alcoholic ammonia, preferably methanolic ammonia.

The ultraviolet spectra of the new compounds prove that the deoxyribosyl group is attached to the uracil ring in 3-position, i.e. in the same position as it is attached in the naturally occurring deoxyuridine or, respectively, thymidine.

The compounds according to the present invention have proved to be of a satisfactory high antiviral activity when tested by treating herpes keratitis of the rabbit's eye.

DESCRIPTION OF THE PREFERRED EMBODIMENTS

The following examples serve to illustrate the present invention without, however, limiting the same thereto.

EXAMPLE 1

4.0 g. of mercury-5-benzyl uracil (0.01 mole) are suspended in 100 cc. of toluene and 20 cc. of toluene are azeotropically distilled off while stirring. After cooling, 8.6 g. of 3',5'-di-p-chloro benzoyl-2'-deoxyribofuranosyl chloride (0.02 mole) are added and the mixture is heated to boiling while stirring and excluding moisture. Thereby, a fairly clear solution is obtained. Heating of said solution under reflux is continued for one more hour while stirring. The solution is then concentrated by evaporation in a vacuum. The residue is dissolved in 50 cc. of chloroform. Undissolved mercury chloride and 5-benzyl uracil are filtered off. The chloroform filtrate is shaken with 30 cc. of a 30% aqueous potassium iodide solution and is washed with a sodium hydrogen carbonate solution and with water. The washed solution is dried over anhydrous sodium sulfate, the chloroform is distilled off in a vacuum, and the residue is dissolved in 10 cc. of toluene. On allowing the solution to stand at room temperature, a mixture of $\alpha$- and $\beta$-di-3',5'-p-chloro benzoyl - 5 - benzyl uracil-2'-deoxyriboside precipitates. The yield is about 80% of the theoretical yield.

One g. of said reaction product is added to 20 cc. of absolute methanol. A few drops of a 1% sodium methanolate solution is admixed thereto. The mixture is heated under reflux with stirring for one hour while moisture is excluded. The resulting solution of still alkaline reaction is concentrated by evaporation in a vacuum. The residue is dissolved in 10 cc. of water. The aqueous solution is treated with the cation exchange agent sold under the trademark "Dowex 50" in its H-form, in order to remove the sodium ions. The resulting aqueous solution is extracted with ether. The extracted aqueous solution is partly concentrated by evaporation in a vacuum. On allowing the concentrated solution to stand, 5-benzyl-2'-deoxy uridine, i.e. 5-benzyl-3-(2'-deoxyribosyl) uracil crystallizes in a yield of 90% of the theoretical yield. Said compound shows in aqueous solution a maximum at 226 m$\mu$ in the ultraviolet spectrum. Said maximum does not shift in an acid or alkaline medium.

By following the procedure described in the preceding example and replacing the mercury salt of 5-benzyl uracil by the mercury salts of substituted 5-benzyl uracils as given in the following table, the corresponding 5-benzyl-21-deoxyuridines are obtained:

| Ex. | Mercury salt of substituted 5-benzyl uracil | Reaction product |
| --- | --- | --- |
| 2 | 5-(4'-chloro benzyl) uracil | 5-(4'-chloro benzyl)-2'-deoxyuridine. |
| 3 | 5-(3',4'-dichloro benzyl) uracil. | 5-(3',4'-dichloro benzyl)-2'-deoxyuridine. |
| 4 | 5-(4'-methyl benzyl) uracil | 5-(4'-methyl benzyl)-2'-deoxyuridine. |
| 5 | 5-(4'-n-propyl benzyl) uracil. | 5-(4'-n-propyl benzyl)-2'-deoxyuridine. |
| 6 | 5-(3',4'-dimethoxy benzyl) uracil | 5-(3',4'-dimethoxy benzyl)-2'-deoxyuridine. |
| 7 | 5-(4'-ethoxy benzyl) uracil | 5-(4'-ethoxy benzyl)-2'-deoxyuridine. |
| 8 | 5-(4'-isopropoxy benzyl) uracil. | 5-(4'-isopropoxy benzyl)-2'-deoxyuridine. |
| 9 | 5-(4'-trifluoro methyl benzyl) uracil. | 5-(4'-trifluoro methyl benzyl)-2'-deoxyuridine. |
| 10 | 5-(3'-nitro benzyl) uracil | 5-(3'-nitro benzyl)-2'-deoxyuridine. |
| 11 | 5-(4'-amino benzyl) uracil | 5-(4'-amino benzyl)-2'-deoxyuridine. |
| 12 | 5-(4'-dimethylamino benzyl) uracil. | 5-(4'-dimethylamino benzyl)-2'-deoxyuridine. |

EXAMPLE 13

Reaction of the trimethyl silyl compound of 5-benzyl uracil with 3,5-di(p-chloro benzoyl) - 2 - deoxy-D-ribofuranosyl chloride to produce 5-benzyl-2'-deoxyuridine, is carried out in the same manner as described in Example 3 of Pat. No. 3,553,192, whereby the 5-propyl uracil of said Example 3 is replaced by the equimolecular amount of 5-benzyl uracil.

In place of 3,5-di-(p-chloro benzoyl)-2-deoxyribofuranosyl chloride used in the examples as the one reactant, there may be used other reactive deoxyribose compounds in which the hydroxyl groups are protected, such as, for instance, 3,5-dibenzoyl-2-deoxyribofuranosyl chloride, 3,5-dianisoyl - 2 - deoxyribofuranosyl chloride, 3,5-di-(p-toluoyl) - 2 - deoxyribofuranosyl chloride, 3,5-di(p-nitrobenzoyl)-2-deoxyribofuranosyl chloride, and other p-(lower alkyl) phenyl, p - (lower alkoxy) phenyl, p-halogeno phenyl, and the like carboxy derivatives of deoxyribose.

EXAMPLE 14

The mercury salts of the 5-benzyl uracil compounds used in the preceding examples as the one reactant are prepared by following the procedure described in Example 5, of Pat. No. 3,553,192, whereby 5-propyl uracil is replaced by the equimolecular amounts of the respective 5-benzyl uracil compounds.

UTILITY

As stated hereinabove, the new compounds exhibit, in contrast to the known deoxyribosyl-free 5-alkyl uracil compounds, a surprisingly high antiviral activity.

The compounds were tested for their antiherpetic activity according to the method described by H. Kaufman, A. B. Nesburn, and E. D. Maloney in "Arch. Ophthalm." vol. 67, page 583 (1962).

The compounds according to the present invention are preferably applied to the herpes-infected areas of the body such as the eye in the form of their aqueous solutions. 0.05% to 0.5% aqueous solutions or solutions in Tyrode's solution or the like and preferably 0.1% to 0.25% solutions have proved to be especially useful.

It is, of course, also possible to apply the active compounds according to the present invention to the infected areas of the body in the form of ointments in suitable pharmaceutical ointment bases which are compatible to the active compounds such as an anhydrous, buffered 0.15% to 0.2% ointment, or in the form of a pharmaceutical powder in mixture with a suitable, well compatible, pulverulent, inert diluent such as talc, colloidal silica, and others.

The ointments are applied to the infected areas of the body and especially to the eye every 2 hours to 5 hours. The ointment compositions given in Examples 7 to 9 of Pat. No. 3,553,192 are composed so that a satisfactory effect which sets in rapidly, is achieved. It is, of course, understood that other ointment bases may also be used.

It is also possible to use sprays containing the active agent in the form of sprayable solutions or dispersions in aqueous or organic solvents which can be atomized by the action of suitable, pharmaceutically acceptable propellants. Such sprayable preparations may also be applied in the form of foams covering the herpes afflicted areas of the body.

The compositions used for therapeutic administration are prepared in the same manner as described in Examples 6 to 9 of Pat. No. 3,553,192, whereby the 5-alkyl-2'-deoxyuridine compounds are replaced by the 5-benzyl-2'-deoxyuridine compounds according to the present invention.

The compounds according to the present invention have proved to be of great therapeutic value in the treatment of virus infections, such as herpes simplex keratitis, herpes analis, herpes labialis, herpes nasalis, herpes buccalis, herpes facialis, herpes genitalis, herpes progenitalis, herpes recidivans, herpes recidivans menstrualis.

An aqueous solution of 0.15 g. of 5-benzyl-2'-deoxyuridine in 10 cc. of isotonic sodium chloride solution was clinically used in the treatment of keratitis caused by herpes infection. During the daytime, one drop each of said solution was dropped into the conjunctival sac of the infected eye per hour while at night one drop each of the solution every two hours was applied. Epithelization of the cornea was achieved in about 95% of the treated patients on administration of the drug for four to five days. No undesired side effects were observed.

Of course, many changes and variations in the starting materials and reactants, in the reaction conditions, temperature, and duration, in the solvents used, in the pharmaceutical compositions employed in therapy and their preparation, in the clinical use of such compositions, and the like may be made by those skilled in the art in accordance with the principles set forth herein and in the claims annexed hereto.

I claim:

1. A (2'-deoxyribosyl) uracil compound of the formula

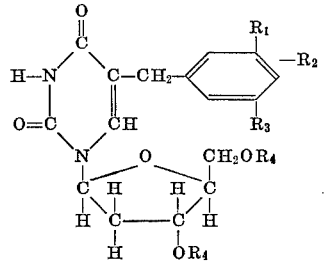

wherein $R_1$, $R_2$ and $R_3$ are members selected from the group consisting of hydrogen, halogen, lower alkyl, lower alkoxy, trifluoro methyl, nitro, amino, mono-lower alkyl substituted amino, and di-lower alkyl substituted amino and $R_4$ is a member selected from the group consisting of hydrogen, lower alkanoyl, benzoyl, lower alkyl benzoyl, lower alkoxy, benzoyl, nitro benzoyl, and halogeno benzoyl.

2. The (2'-deoxyribosyl) uracil compound according to claim 1, said compound being 5-benzyl-3-(2'-deoxyribosyl) uracil.

3. The diacylated (2'-deoxyribosyl) uracil compound according to claim 1, said compound being 5-benzyl-3-(di-p-chloro benzoyl-2'-deoxyribosyl) uracil.

References Cited

UNITED STATES PATENTS

| | | | |
|---|---|---|---|
| 2,885,396 | 5/1959 | Heidelberger et al. | 260—211.5 |
| 3,208,997 | 9/1965 | Iwai et al. | 260—211.5 |
| 3,282,919 | 11/1966 | Curran et al. | 260—211.5 |
| 3,328,389 | 6/1967 | Shimizu et al. | 260—211.5 |

LEWIS GOTTS, Primary Examiner

J. R. BROWN, Assistant Examiner

U.S. Cl. X.R.

424—180

PO-1050
(5/69)

UNITED STATES PATENT OFFICE
CERTIFICATE OF CORRECTION

Patent No. 3,642,771                Dated February 15, 1972

Inventor(s) Kailash Kumar Gauri

It is certified that error appears in the above-identified patent and that said Letters Patent are hereby corrected as shown below:

Column 2, line 57:   After "ammonia" insert a comma -- , --.
Column 3, line 73:   After "3,5-di" insert a hyphen.
Column 6, line 7:    Omit the comma between "lower alkoxy" and "benzoyl".

Signed and sealed this 4th day of July 1972.

(SEAL)
Attest:

EDWARD M. FLETCHER, JR.                ROBERT GOTTSCHALK
Attesting Officer                      Commissioner of Patents